(12) United States Patent
Mattice et al.

(10) Patent No.: US 7,481,646 B2
(45) Date of Patent: *Jan. 27, 2009

(54) COMPRESSION MOLDING MACHINE

(75) Inventors: Daniel L. Mattice, Columbia City, IN (US); B. Jack Rote, Sturgis, MI (US)

(73) Assignee: Rexam Closure Systems Inc., Perrysburg, OH (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/156,114

(22) Filed: Jun. 17, 2005

(65) Prior Publication Data

US 2006/0286191 A1    Dec. 21, 2006

(51) Int. Cl.
*B28B 5/06* (2006.01)

(52) U.S. Cl. .................. 425/348 R; 425/412; 425/423; 425/809

(58) Field of Classification Search .............. 425/259, 425/348 R, 408, 412, 349, 422, 423, 809
See application file for complete search history.

(56) References Cited

U.S. PATENT DOCUMENTS

| | | | |
|---|---|---|---|
| 2,027,915 A | 1/1933 | Kux | |
| 2,471,139 A | 5/1949 | Benander et al. | |
| 3,210,805 A | 10/1965 | Hanai | |
| 3,635,612 A | 1/1972 | Fortin et al. | |
| 3,730,665 A | 5/1973 | Fortin et al. | |
| 3,764,250 A | 10/1973 | Waterloo | |
| 3,827,843 A | 8/1974 | Blouch | |
| 3,829,272 A | 8/1974 | Carillon et al. | |
| 3,938,928 A | 2/1976 | Andrews | |
| 4,028,038 A | 6/1977 | Haigh | |
| 4,370,124 A | 1/1983 | Buja | |
| 5,645,870 A | 7/1997 | Larsen | |
| 5,670,100 A | 9/1997 | Ingram | |
| 5,786,079 A | 7/1998 | Alieri | |
| 5,840,349 A | 11/1998 | Brown, Jr. et al. | |
| 6,179,605 B1 | 1/2001 | Littleton et al. | |
| 6,478,568 B2 * | 11/2002 | Ingram | 425/297 |
| 6,736,628 B1 | 5/2004 | Zuffa | |
| 2001/0046527 A1 * | 11/2001 | Arndt et al. | 425/126.1 |
| 2001/0051193 A1 | 12/2001 | Lichtinger | |
| 2002/0025356 A1 | 2/2002 | Ingram | |
| 2003/0003187 A1 | 1/2003 | Coran et al. | |
| 2003/0198708 A1 | 10/2003 | Pucci | |
| 2004/0145087 A1 | 7/2004 | Cerny et al. | |
| 2005/0031723 A1 * | 2/2005 | Zoppas | 425/348 R |

* cited by examiner

*Primary Examiner*—Yogendra Gupta
*Assistant Examiner*—Maria Veronica D Ewald
(74) *Attorney, Agent, or Firm*—Reising, Ethington, Barnes, Kisselle, P.C.

(57) ABSTRACT

A machine for compression molding plastic articles includes an array of compression molds mounted on a support for movement through a defined mold path. A cam is disposed adjacent to the support to engage the molds in sequence and move at least one segment of each mold between open and closed positions. The cam has a first portion for opening the molds, a second portion for closing the molds in sequence and a pivot mounting the second cam portion to the first cam portion. A latch holds the second cam portion in a first position for closing the molds in sequence, and is responsive to excess force on the second cam portion to release said second cam portion to pivot to a second position spaced from the path.

22 Claims, 10 Drawing Sheets

COMPRESSION MOLDING MACHINE

BACKGROUND AND SUMMARY OF THE DISCLOSURE

Machines for compression molding closure shells, or compression molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the male mold section and a charge of plastic material is placed in the female mold section, and a closed position in which the male and female mold sections are brought together to compression mold the shell or liner. In a liner machine, premade shells are placed in a nest when the mold sections are open, and a charge or pellet of liner material is placed within the shell before the molds are closed. U.S. patents that illustrate machines of this type for compression molding plastic closure shells include U.S. Pat. Nos. 5,670,100, 5,989,007, 6,074,583 and 6,478,568. U.S. patents that illustrate machines of this type for compression molding sealing liners within closure shells include U.S. Pat. No. 5,451,360.

Although vertical axis carousel-type machines of the noted type have enjoyed substantial commercial acceptance and success, innovation remains desirable. In particular, in vertical axis carousel-type machines, the mold forces and the weight of the rotating equipment are parallel to the vertical axis of rotation, creating a bending moment with respect to the axis of rotation and the bearings and shaft that support the carousel. Carousel-type machines also require a substantial amount of valuable floor space in a manufacturing facility. It is a general object of the present disclosure, in accordance with one aspect of the disclosure, to provide a method and apparatus for compression molding plastic articles, such as plastic closures and plastic liners within closure shells, which reduce the forces applied to the support frame and bearings, reduce maintenance requirements and the amount of energy needed to operate the machine, and/or reduce the amount of floor space required per machine.

The present disclosure involves a number of aspects that can be implemented separately from or in combination with each other.

A compression molding machine in accordance with a first aspect of the present disclosure includes a wheel mounted for rotation around a horizontal axis and a plurality of angularly spaced molds disposed around the wheel. Each of the molds includes a first mold segment and a second mold segment disposed radially outwardly of the first mold segment. Each of the second mold segments is movable by a cam radially with respect to the associated first mold segment between a radially inner closed position with the first mold segment for compression molding a plastic article, and a radially outer open position spaced from the associated first mold segment for removing a molded article from the mold and placing a mold charge into the mold.

In preferred embodiments of the disclosure, the cam includes a first cam portion for engaging the second mold segments in sequence and moving the second mold segments from the closed position to the open position, and a second cam portion positioned downstream of the first cam portion (with respect to the direction of wheel rotation) for moving the second mold segments in sequence from the open position to the closed position. In some presently preferred embodiments, a cam displacement wheel is disposed adjacent to the second cam portion, such as by being rotatably mounted on the second cam portion, for moving the second mold segments toward the closed position. The cam displacement wheel rapidly moves the second mold segments from the open position toward the closed position.

In another aspect of the disclosure, the second cam portion may be movably mounted with respect to the first cam portion, preferably by being pivotally mounted at the downstream end of the first cam portion. The second cam portion in this aspect of the disclosure preferably is coupled to a spring-biased latch for release in the event of excess force applied to the second cam portion by the cam followers on the second mold segments.

A machine for compression molding plastic articles, in accordance with a further aspect of the disclosure, includes an array of compression molds mounted on a support (such as a vertical or horizontal mold wheel) for movement through a defined mold path. A cam is disposed adjacent to the support to engage the molds in sequence and move at least one segment of each mold between open and closed positions. The cam has a first portion for opening the molds, a second portion for closing the molds in sequence, and a pivot mounting the second cam portion to the first cam portion. A latch holds the second cam portion in a first position for closing the molds in sequence, and is responsive to excess force on the second cam portion to release said second cam portion to pivot to a second position spaced from the path.

A machine for molding plastic articles, in accordance with yet another aspect of the disclosure, includes at least one mold carried by a movable support, such as a vertical or horizontal mold wheel. The mold includes at least one mold segment that is movable between open and closed positions. At least one cam is disposed adjacent to the support for engaging the at least one mold segment. The at least one cam includes a first cam portion for moving the mold segment to an open position, a second cam portion for moving the mold segment to a closed position, and a cam displacement wheel disposed adjacent to the first and second cam portions for displacing the mold segment from the first cam portion onto the second cam portion. The cam displacement wheel preferably is mounted for rotation in synchronism with motion of the support, most preferably at constant velocity. The at least one mold segment preferably has a cam follower for engaging the first and second cam portions in sequence, and the cam displacement wheel has at least one arm for engaging the cam follower on the first cam portion and displacing the cam follower onto the second cam portion.

A machine for handling articles (e.g., molding plastic articles), in accordance with a further aspect of the disclosure, includes at least one tool (e.g., a mold) carried by a movable support, such as a vertical or horizontal mold wheel. The tool includes at least one tool segment that is movable between first and second (e.g., open and closed) positions. At least one cam is disposed adjacent to the support for engaging the at least one tool segment. The at least one cam includes a first cam portion for moving the tool segment to an open position, a second cam portion for moving the tool segment to a closed position, and a cam displacement wheel disposed adjacent to the first and second cam portions for displacing the tool segment from the first cam portion onto the second cam portion. The cam displacement wheel preferably is mounted for rotation in synchronism with motion of the support, most preferably at constant velocity. The at least one tool segment preferably has a cam follower for engaging the first and second cam portions in sequence, and the cam displacement wheel has at least one arm for engaging the cam follower on the first cam portion and displacing the cam follower onto the second cam portion.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

The disclosure of U.S. application Ser. No. 11/109,374 filed Apr. 19, 2005 is incorporated herein by reference.

Figure 1:
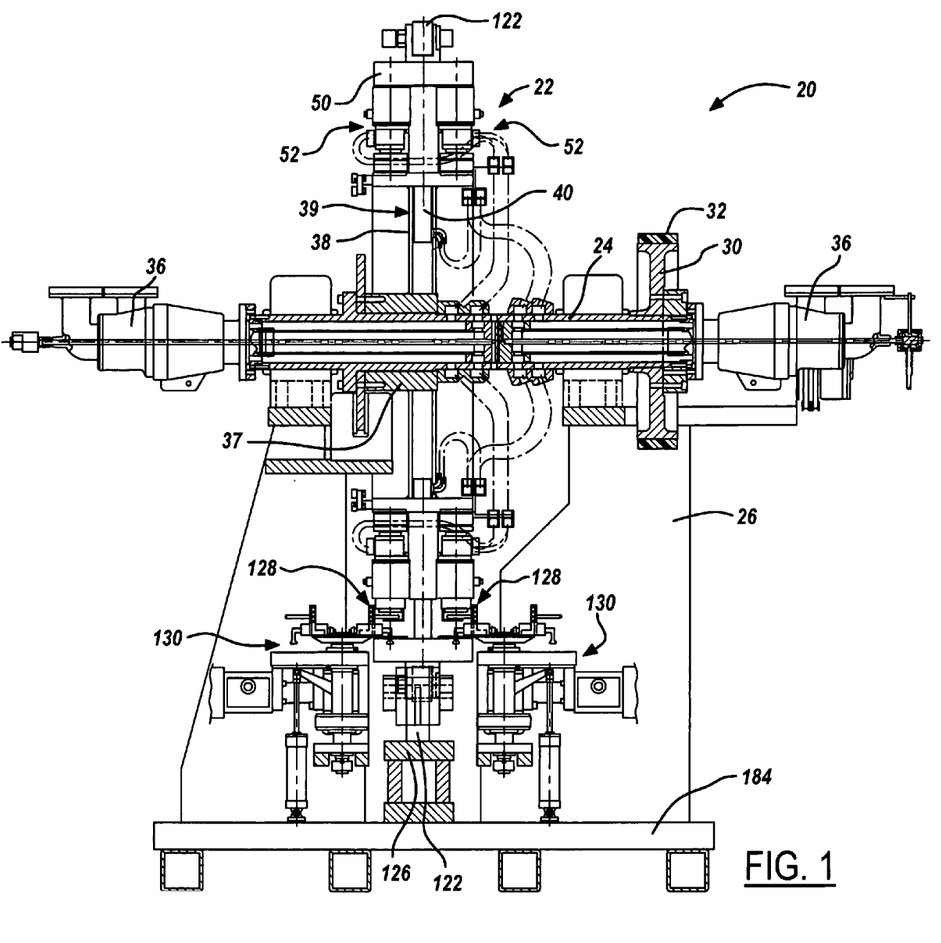
FIG. 1 is a front elevational view of a compression molding machine in accordance with one presently preferred embodiment of the disclosure.
Figure 2:
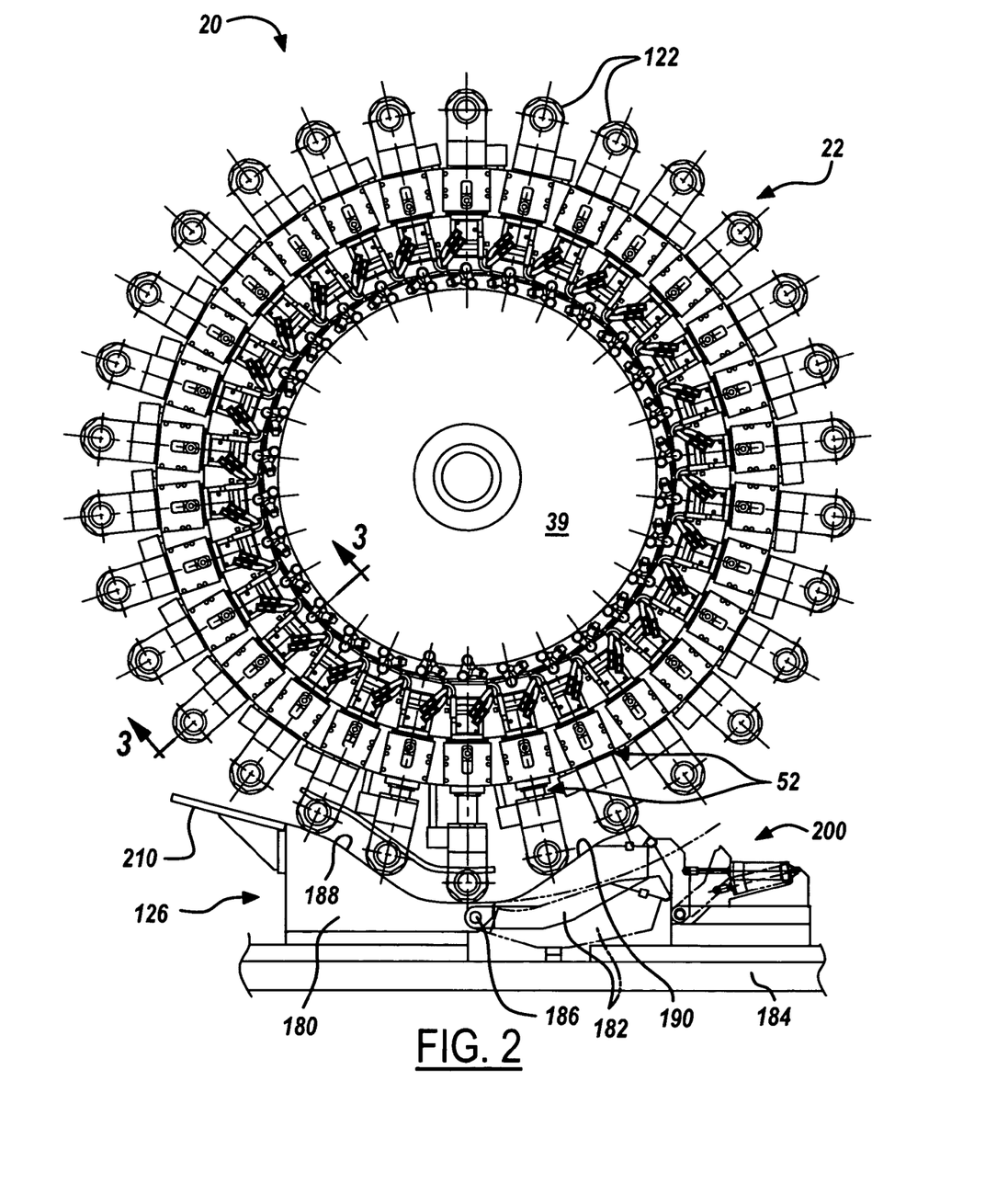
FIG. 2 is a side elevational view of the compression molding machine illustrated in FIG. 1.

FIGS. 1-2 illustrate a machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced radially extending support spokes 38. Each support spoke 38 is hollow at its outer end. A rod 40 is slidably supported by sleeve bearings 42 (FIGS. 3B-3C) within the hollow outer end of each spoke 38. A crossbar 50 is coupled to the end of each rod 40, so that the combination of rod 40 and bar 50 is generally T-shaped as viewed from the tangential direction in FIG. 1. A pair of radially spaced external supports 44, 46 (FIGS. 3B-3C) are provided on each spoke 38. A plurality of angularly spaced molds 52 are disposed around the periphery of wheel 22, preferably on both sides of the wheel. Each mold 52 is disposed between supports 44, 46 on an associated spoke 38 and an end of crossbar 50 on rod 40. All of the molds 52 preferably are identical.

Figure 3A:
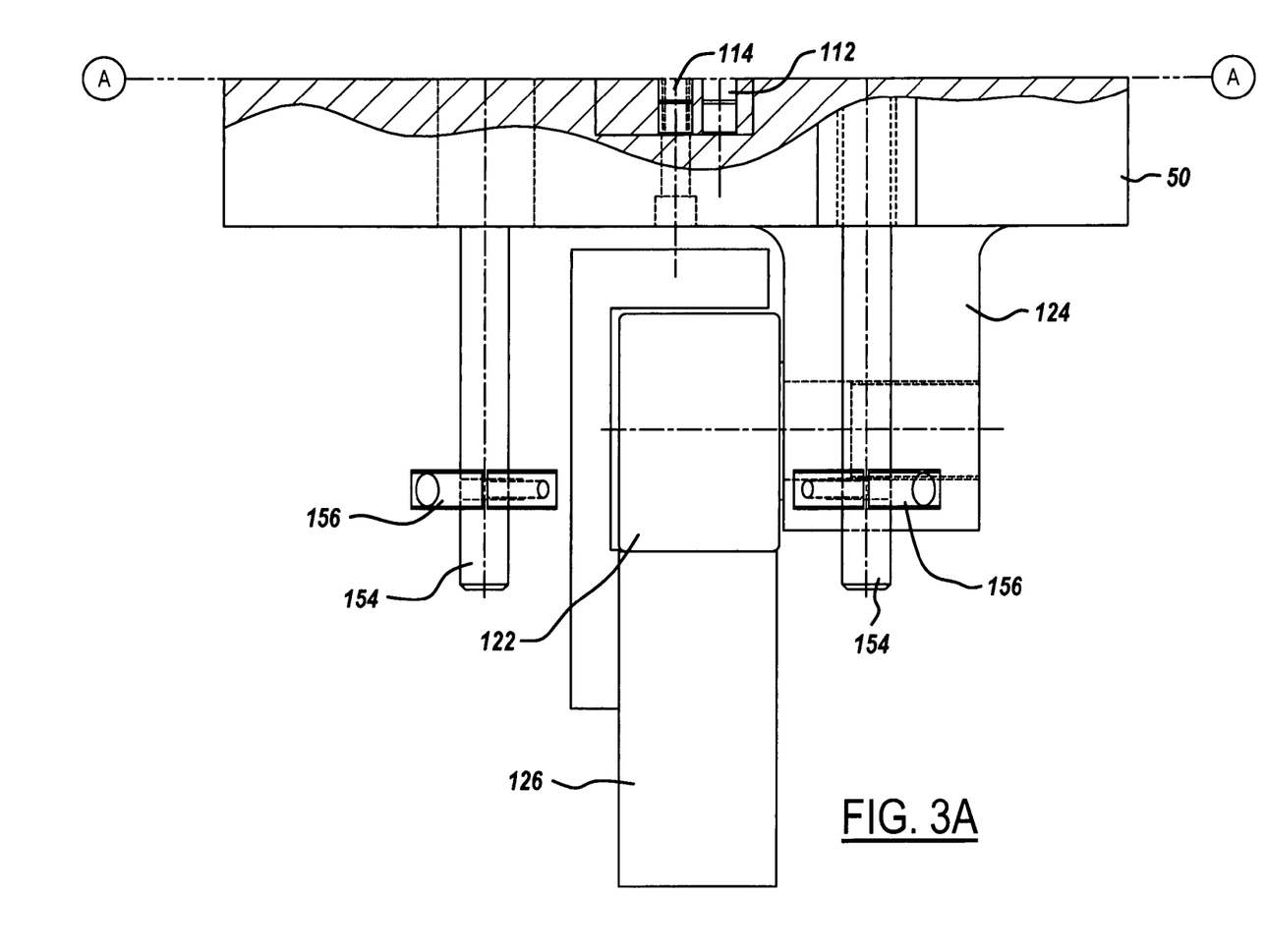
FIGS. 3A-3D together form a sectional view taken substantially along the line 3-3 in FIG. 2.
Figure 3B:
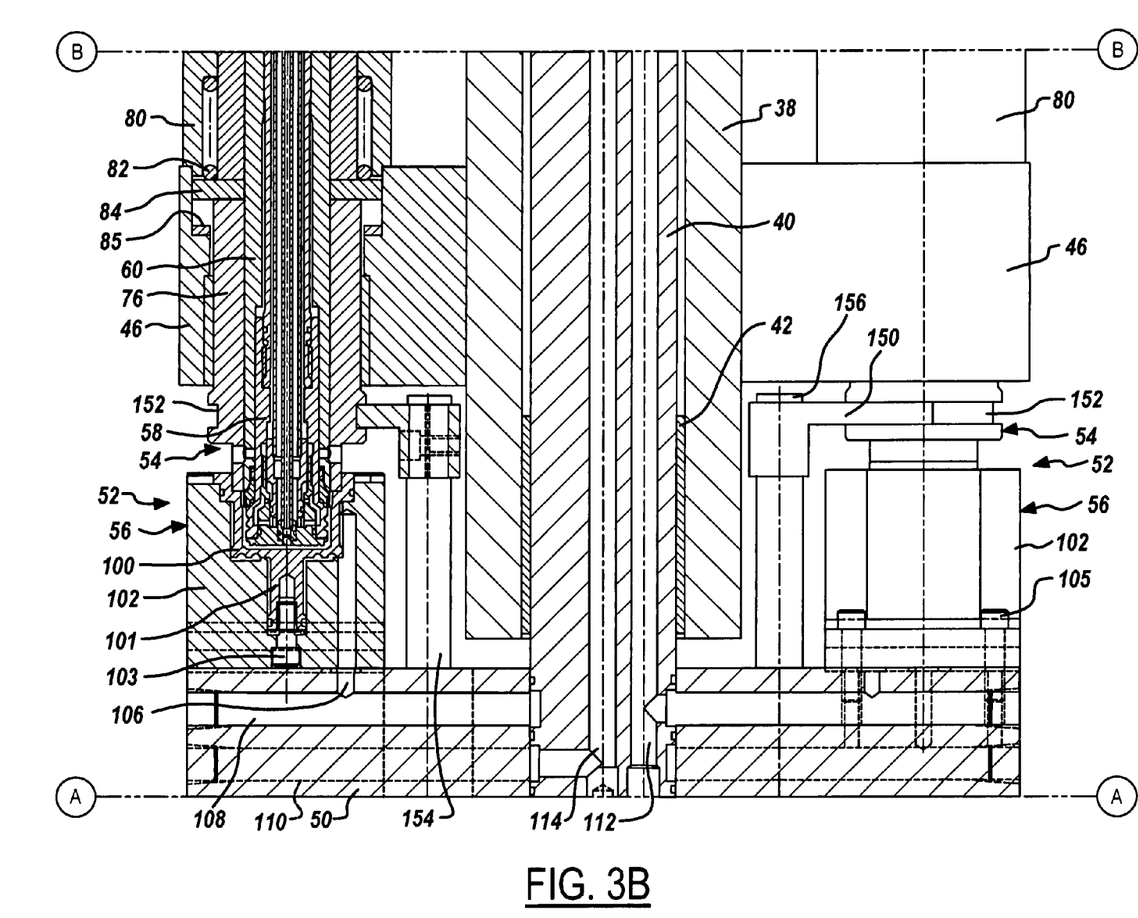
Figure 3C:
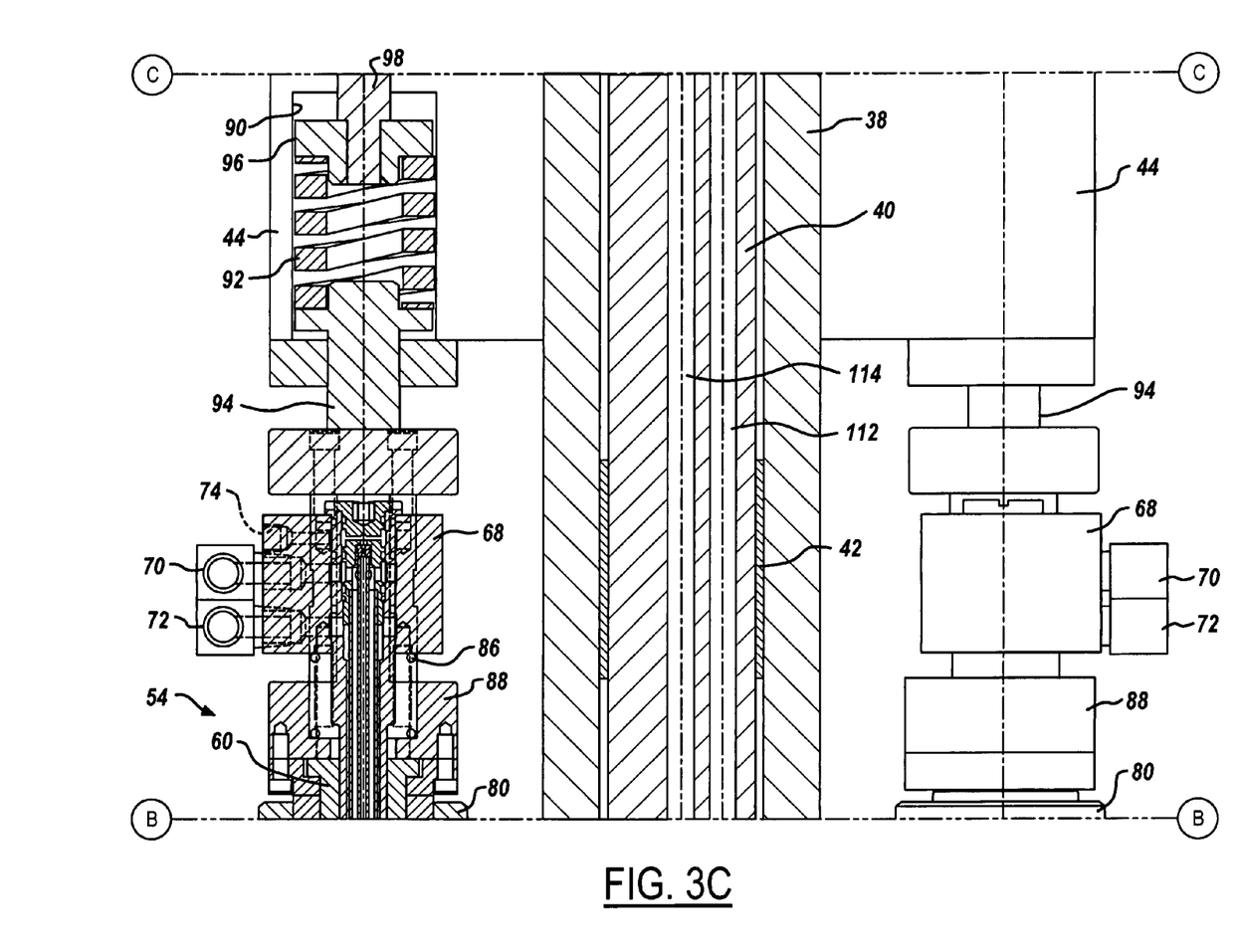

Each mold 52 includes a radially inner first mold section or segment 54 and a second mold section or segment 56 in radially outward alignment with an associated first mold segment 54 (FIGS. 3B-3C). In the illustrated embodiments, the radially inner first mold segment 54 is a male mold segment, and the radially outer second mold segment 56 is a female mold segment, although these mold segments could be reversed in accordance with the broadest principles of the disclosure. First or male mold segment 54 includes a mold core 58 slidably mounted within a surrounding sleeve 60. Mold core 58 has an end or tip 62 contoured for compression molding the inside surfaces of a closure shell. A first or outer tube 64 extends coaxially through the hollow interior of mold core 58 forming a first annular passage between the exterior surface of tube 64 and the interior surface of core 58. A second tube or other passage 66 extends through the interior of tube 64, preferably coaxially with tube 64 and core 58, forming a second annular passage between the exterior surface of tube 66 and the interior surface of tube 64. The second annular passage between tubes 64, 66 is coupled at a manifold block 68 to a coolant inlet fitting 70. Likewise, the first annular passage between tube 64 and core 58 is coupled at manifold block 68 to a coolant outlet fitting 72. (The "inlet" and "outlet" functions can be reversed.) Thus, coolant can be fed from fitting 70 through the second passage between tubes 64, 66 to the tip 62 of core 58, and thence through the first passage between tube 64 and core 58 to outlet fitting 72. An inlet 74 on manifold block 68 is coupled to the interior of tube 66, and can be connected to a source of compressed air for example to assist stripping of closure shells from core tip 62. Manifold block 68 preferably is mounted on the radially inner end of mold core 58—i.e., the end opposite from core tip 62.

A stripper sleeve 76 (FIG. 3B) surrounds sleeve 60 and is slidably supported by a bearing 78 within support 46. A cap 80 is secured to support 46, and a coil spring 82 is captured in compression between cap 80 and a washer 84 slidably disposed within support 46 in abutment with the inner end of stripper sleeve 76. Thus, spring 82 biases stripper sleeve 76 toward the second or female mold segment 56 of each mold 52. When the mold is open, washer 84 abuts a surface 85 within support 46 to limit outward movement of stripper sleeve 76 over core 58. A second coil spring 86 (FIG. 3C) is captured in compression between manifold block 68 and an abutment 88 coupled to the end of sleeve 60. Thus, core 58 is biased by spring 86 inwardly against sleeve 60. Each support 44 (FIG. 3C) has an interior pocket 90 that opens radially outwardly toward and in alignment with the associated first mold segment 54. A coil spring 92 is captured in compression within each pocket 90 and engages an extension 94 coupled to an abutment 88 on sleeve 60. Thus, as pressure to form the closure shell or liner pushes on core 56, core 56 pushes against sleeve 60, which pushes against spring 92 to maintain forming pressure on the melt. (Coil springs 92 can be replaced by fluid springs.) Within pocket 90, spring 92 engages a plate 96 that is coupled to an adjustment screw 98 for individually adjusting the force applied by each spring 92.

Figure 3D:
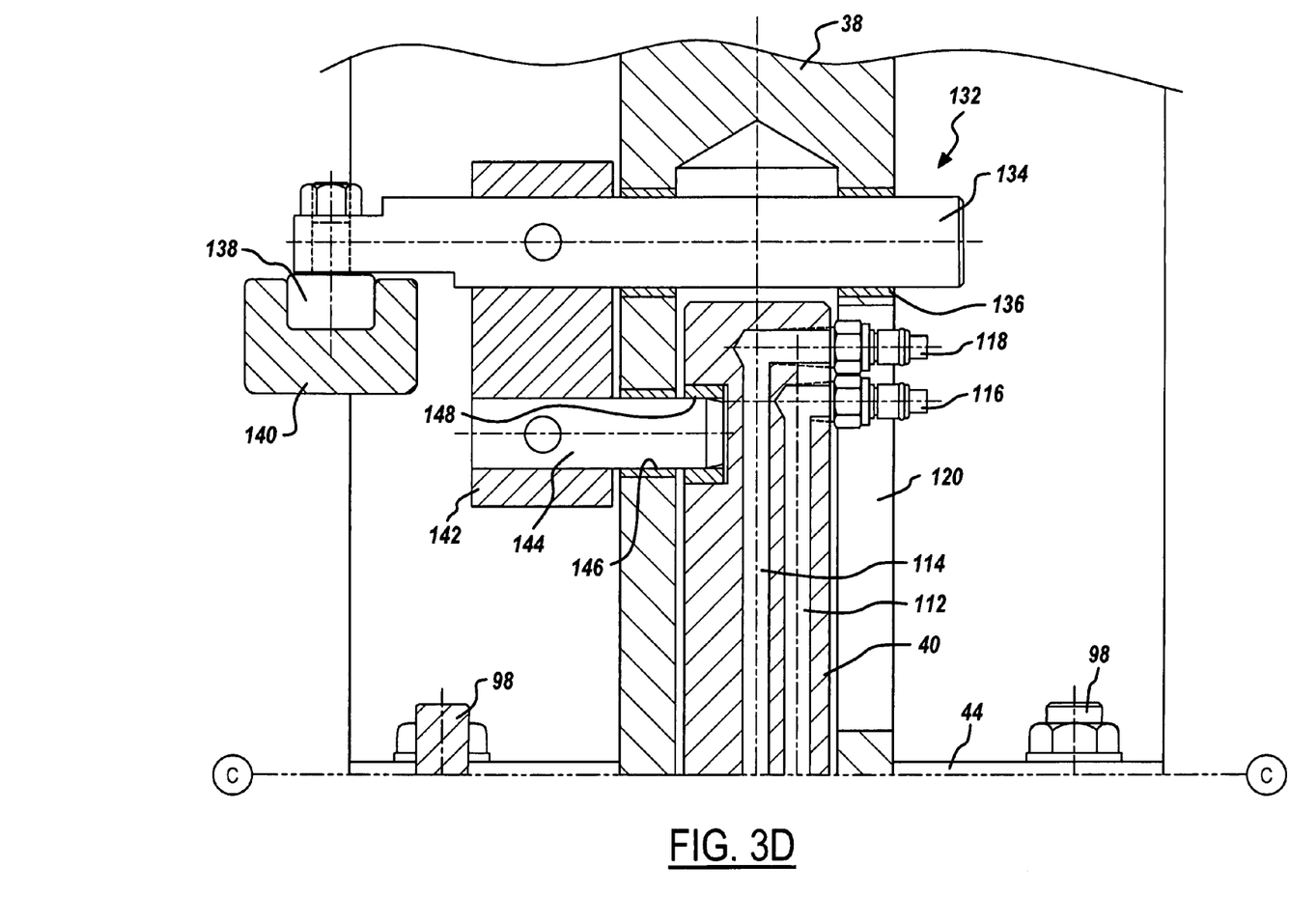

Second or female mold segment 56 (FIG. 3B) preferably includes a cavity-forming insert 100 having an extension 101 that receives a screw 103 removably to mount the insert on a support block 102. Blocks 102 are removably mounted on crossbar 50 by screws 105 (FIGS. 3B and 4B). Block 102 has coolant passages 106 that communicate in the illustrated embodiment with lateral passages 108, 110 in crossbar 50, and thence to longitudinal radial passages 112,114 in rod 40. As best seen in FIG. 3D, passages 112,114 in rod 40 are connected to fittings 116,118 for circulation of coolant through rod 40, crossbar 50 and block 102 to cool mold cavity inserts 100. It will be noted in FIG. 3D that fittings 116,118 extend through a slot 120 in spoke 38 to permit radial movement of rod 40 with respect to spoke 38.

Figure 2A:
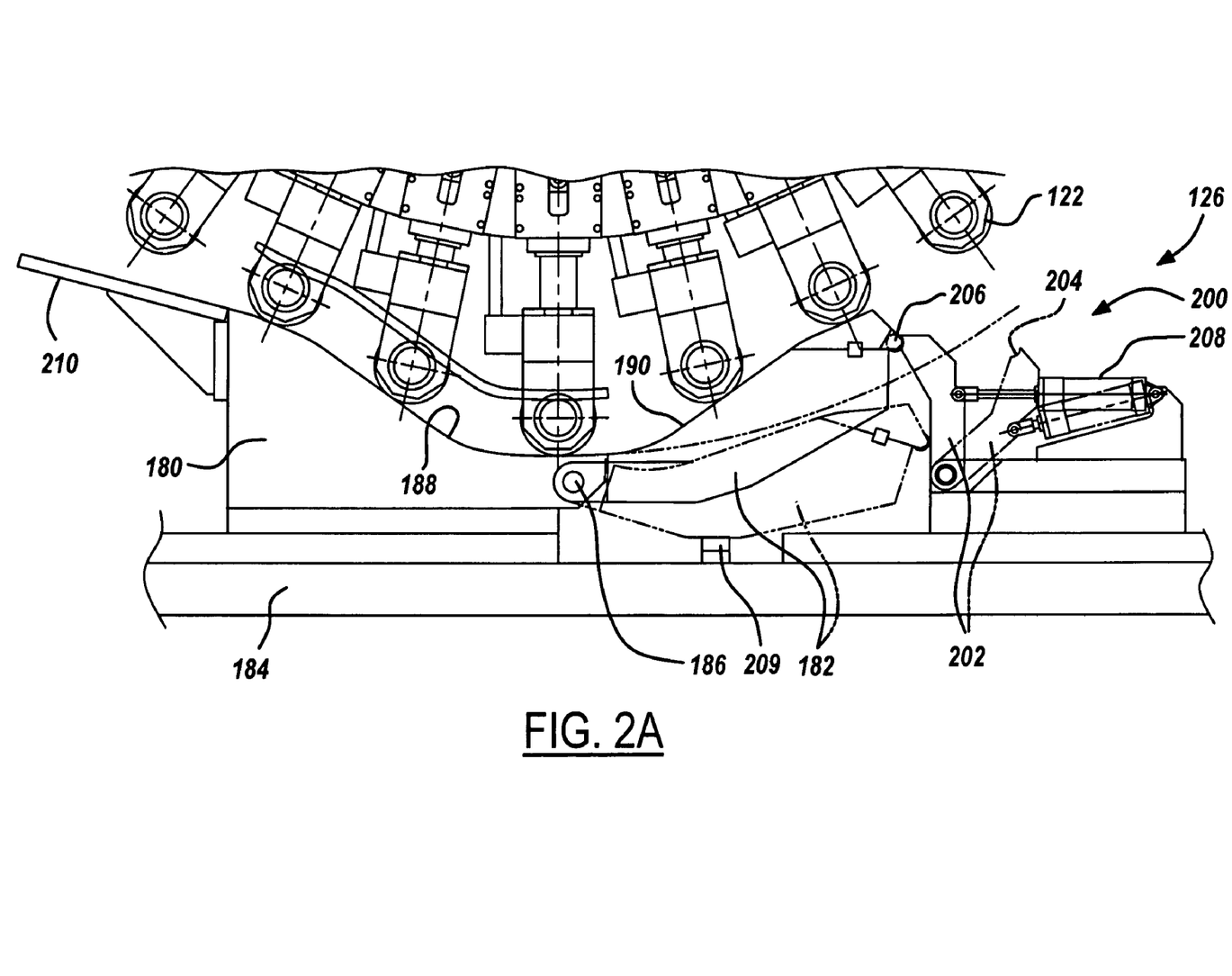
FIG. 2A is an enlargement of a portion of FIG. 2.

A cam follower roller 122 (FIGS. 1, 2 and 3A) is rotatably mounted on a leg 124 that extends radially outwardly from crossbar 50. (Directional words such as "radially," "laterally," "outwardly," "inwardly" and "tangentially" are employed by way of description and not limitation with respect to the horizontal axis of rotation of the wheel.) Leg 124 is offset from the axis of rod 40 on which crossbar 50 is mounted so that cam follower roller 122 is aligned with the axis of rod 40. Each cam follower roller 122 on each crossbar 50 thus is associated, in the illustrated exemplary embodiment, with two molds 52 located on opposite sides of wheel 22. A cam 126 preferably is disposed along the lower arc of the periphery of wheel 22, as best seen in FIGS. 2 and 2A, for engaging cam follower rollers 122 in sequence as wheel 22 rotates around its horizontal axis. During counterclockwise rotation of wheel 22, in the orientation of FIG. 2, follower rollers 122 of each pair of molds 52 in sequence are engaged and captured by cam 126 to pull second mold segments 56 outwardly and downwardly away from first mold segments 54. When each mold in turn is fully open, molded parts or articles are removed from the mold cavities by a suitable part removal apparatus 128 (FIG. 1). A new mold charge is then placed within each mold cavity by a suitable charge placement apparatus 130. As wheel 22 continues rotation, second mold segments 56 in sequence are moved upwardly and inwardly to their closed positions with respect to first mold segments 54 by the counterclockwise end of cam 126, again in the orientation of FIG. 2. Each spoke 38 preferably carries a latch 132 for locking the mold sections to each other in the fully closed position so that there is no need for cam 126 to extend entirely around the periphery of wheel 22.

Molded article removal apparatus 128 and mold charge placement apparatus 130 may be of any suitable types. For example, mold charge placement apparatus 130 may be a disk-type apparatus of the type illustrated in U.S. Pat. No. 5,603,964. As an alternative, exemplary mold charge placement devices 130 and molded part removal devices 128 are discussed in detail in the above-referenced application. The foregoing discussion in connection with FIGS. 1-3D, and particularly FIGS. 3A-3D, is provided by way of an exemplary environment for disclosure of cam 126 and modifications.

Cam 126 may comprise a single solid cam structure, but preferably includes an over-pressure release as shown in FIGS. 2 and 2A. In the embodiment of FIGS. 2 and 2A, cam 126 includes a first or upstream cam portion 180 (with respect to the direction of wheel rotation). First cam portion 180 preferably is mounted in fixed position on a machine bed 184. A second or downstream cam portion 182 is movably mounted, preferably pivotally mounted by a pin 186 to the downstream end of first cam portion 180. First cam portion 180 has a cam surface 188 that increases in radius with respect to the axis of rotation of wheel 22 for opening the molds in sequence, while second cam portion 182 has a cam surface 190 of decreasing radius with respect to the wheel axis for engagement by rollers 122 to close the molds in sequence.

Second cam portion 182 preferably is held in position by a releasable latch 200 that opens in the event of excessive force on cam portion 182. Latch 200 preferably includes a latch arm 202 pivotally operatively coupled at one end to machine bed 184 and having a second end with a pocket 204 or the like that releasably captures a detent 206, which preferably is disposed at the downstream end of second cam portion 182. Latch arm 202 is biased toward second cam portion 182 by a spring 208, which may comprise a fluid spring (e.g., air or oil) as shown or a suitable mechanical spring. Thus, in the event of excess force on cam portion 182, such as in the event excess plastic in the mold cavity, detent 206 moves out of pocket 204 and moves to the position shown in phantom against a stop 209. Wheel 22 continues to rotate with the mold segments open. An extension 210 on cam portion 180 captures the open mold segments upon continued rotation of wheel 22.

Figures 4, 4A:
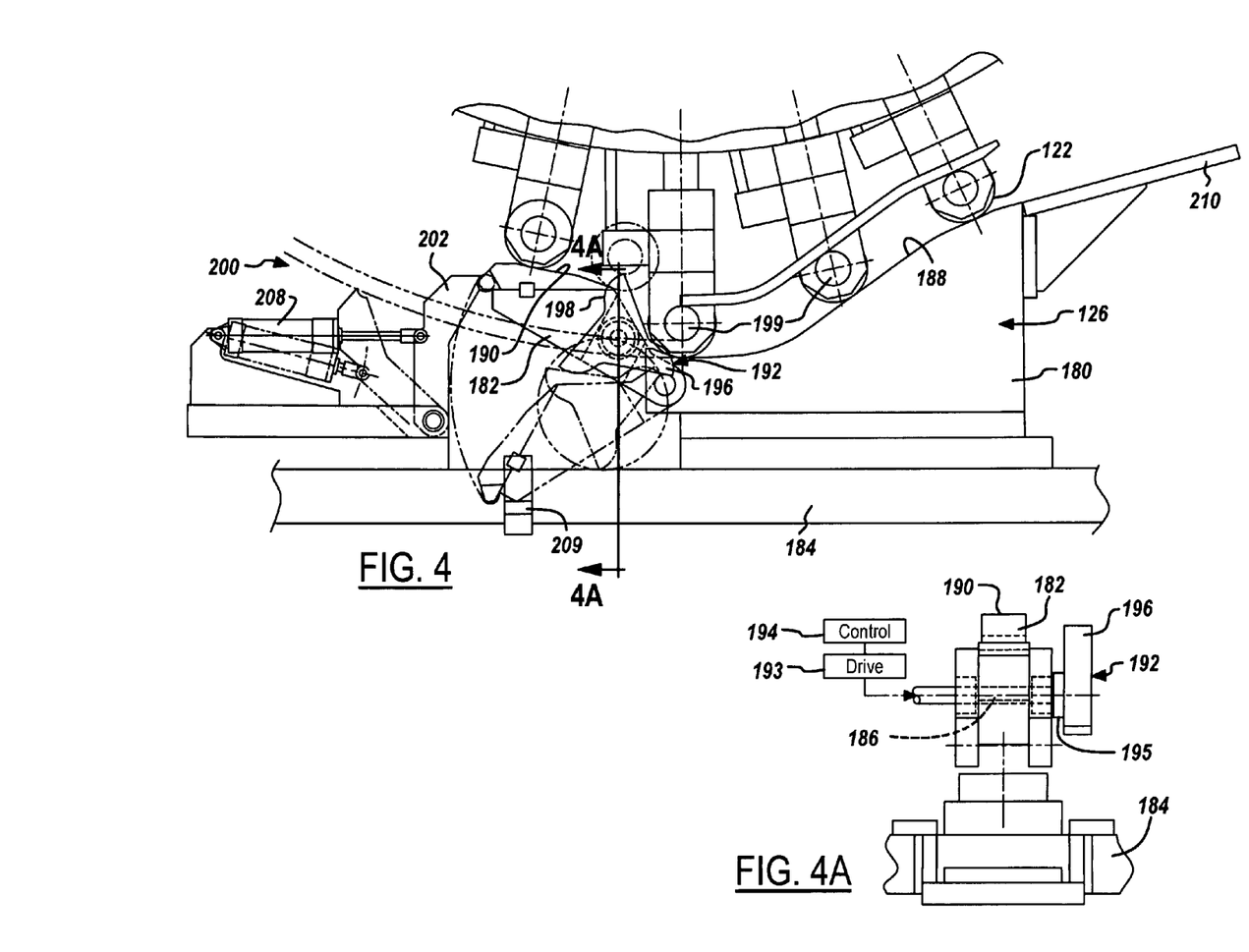
FIG. 4 is a fragmentary front elevational view of a modification to the machine of FIG. 2.
FIG. 4A is a fragmentary sectional view taken substantially along the line 4A-4A in FIG.4.
Figure 5A:
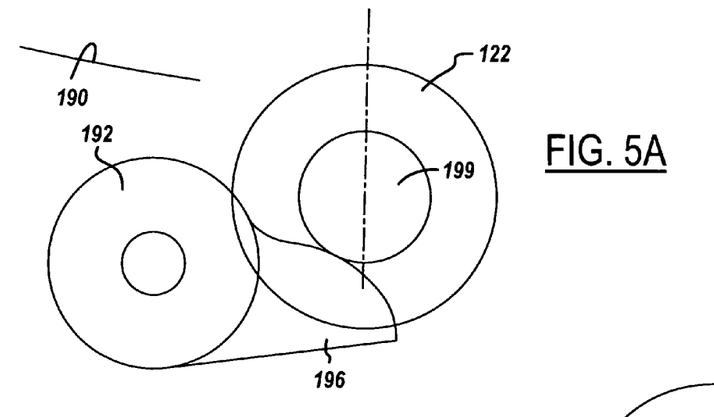
FIGS. 5A-5C are schematic diagrams that illustrate sequential stages of operation of the embodiments of FIG. 4.
Figure 5B:
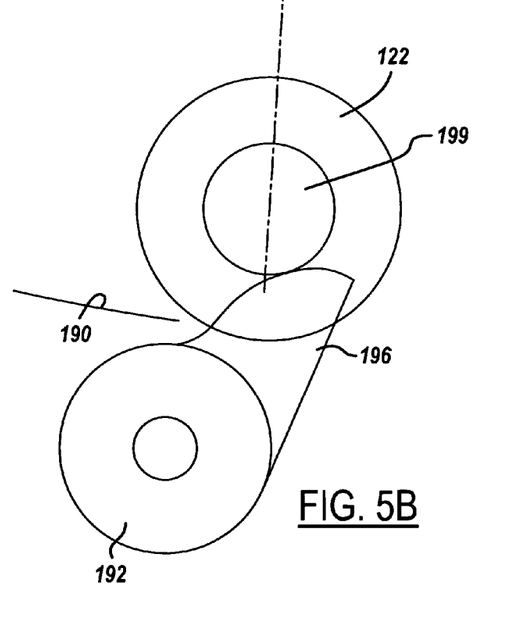
Figure 5C:
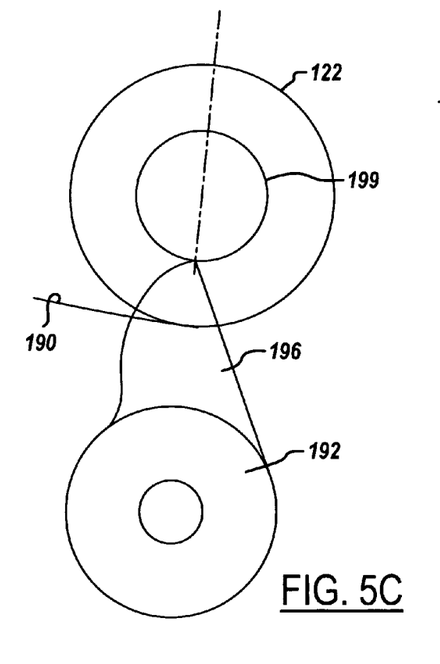

FIGS. 4-5C illustrate a modification to the mold opening/closing cam 126 illustrated in FIG. 2. In the embodiment of FIGS. 4-5C, a cam displacement wheel 192 is provided affirmatively to move or lift mold section roller 122 from cam portion 180 onto a foreshortened second cam portion 182 and thereby reduce the angular rotation of the wheel needed to close the mold sections. Cam displacement wheel 192 preferably is rotatably mounted on cam portion 182 and is coupled to a drive 193. Drive 193 may comprise a servomotor, for example, coupled to a servomotor control 194. Alternatively, drive 193 may be a cam drive coupled to the drive motor for wheel 22 (FIGS. 1-2). Cam displacement wheel 192 thus is rotated in synchronism with rotation of wheel 22 to lift or displace cam rollers 122 in sequence from cam portion 180 to cam portion 182. Wheels 22, 192 preferably rotate at constant angular velocity in synchronism with each other. Drive 193 preferably is coupled to wheel 192 through pivot 186. A gear drive 195 (FIG. 4A) couples pivot 186 to wheel 192 to rotate the wheel. Cam displacement wheel 192 reduces the load on the guide bearings on wheel 22 and the angular wheel displacement required to close the molds.

In the embodiment of FIGS. 4-5C, cam displacement wheel 192 has three angularly spaced radially extending arms 196. The leading edge 198 of each arm 196 (with respect to the counterclockwise direction of rotation of wheel 192 in FIGS. 4 and 5A-C) has a rounded contour to engage and lift a roller 199 cantilevered coaxially with cam roller 122 on each mold section 56. FIG. 5A illustrates initial engagement or contact of a cam arm 196 with a roller 199. As arm 196 rotates (counterclockwise in FIGS. 5A-5C), roller 199 moves from the mid portion of edge 196 in FIG. 5A through the position of FIG. 5B toward the position of FIG. 5C. In FIG. 5C, roller 199 rests on the tip of arm 196 and roller 122 is placed on the surface 190 of cam portion 182. Edges 198 in sequence thus are profiled to impart inward motion to mold segments 56 ("inward" with respect to the axis of mold wheel rotation) without generating detrimental dynamic forces on cam portion 182 or wheel 192. In one presently preferred implementation, cam displacement wheel 192 reduces the time required for displacing mold segments 52, in units of degrees of rotation of wheel 22, by a factor of 60%.

Figure 6:
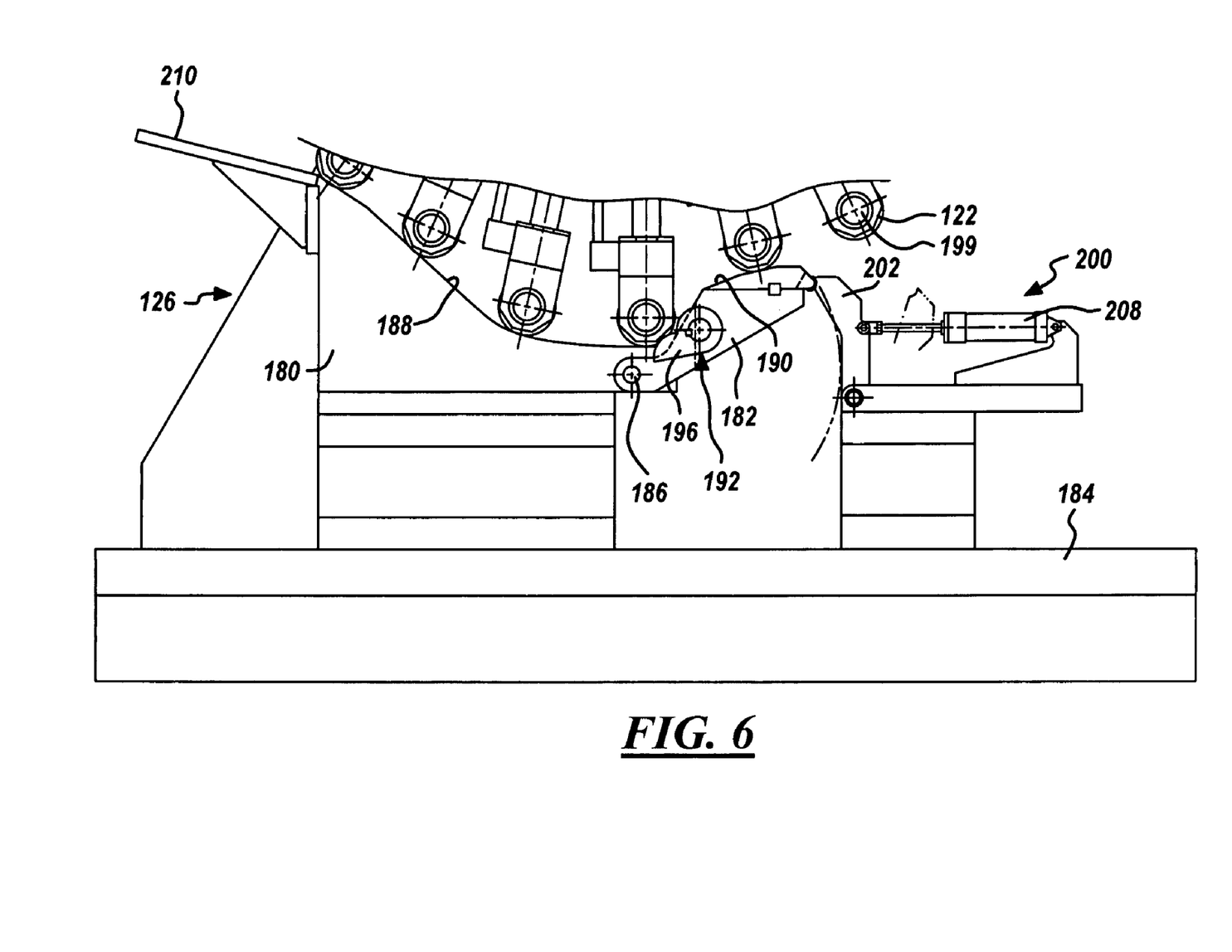
FIG. 6 is a fragmentary front elevational view of a modification of the embodiment of FIG. 4.

FIG. 6 illustrates a modification to the embodiment of FIG. 4, in which cam displacement wheel 192 has a single arm 196. The number of arms needed on the cam displacement wheel depends upon the speed of rotation of wheel 22 and the load placed on wheel 192 by the cam sections in sequence.

There thus have been disclosed a machine and method for compression molding plastic articles, which fully satisfy all of the objects and aims previously set forth. The disclosure has been presented in conjunction with several presently preferred embodiments, and a number of additional modifications and variations have been discussed. Other modifications and variations readily will suggest themselves to persons of ordinary skill in the art. The disclosure is intended to embrace all such modifications and variations as fall within the spirit and broad scope of the appended claims.

The invention claimed is:

1. A compression molding machine that includes:
   a wheel mounted for rotation around a horizontal axis and a plurality of angularly spaced molds disposed around said wheel,
   each of said molds including a first mold segment and a second mold segment disposed radially outwardly of said first mold segment at least when said molds are closed,
   each of said second mold segments being movable radially with respect to the associated first mold segment between a radially inner closed position with said first mold segment and a radially outer open position spaced from the associated first mold segment for removing a molded article from said mold and placing a mold charge into said mold, and a cam disposed adjacent to said wheel for engaging said second mold segments in sequence during rotation of said wheel to move said second mold segments between said open and said closed positions.

2. The machine set forth in claim 1 wherein said cam has a first cam portion of increasing radius with respect to said horizontal axis for moving said second mold segments in sequence from said closed position to said open position, and a second cam portion of decreasing radius with respect to said horizontal axis for moving said second mold segments in sequence from said open position to said closed position.

3. The machine set forth in claim 2 including at least one cam displacement wheel disposed for engagement by said second mold segments in sequence, said cam displacement wheel being coupled to a motor and having at least one arm disposed to engage and move said second mold segments in sequence from said first cam portion onto said second cam portion.

4. The machine set forth in claim 3 wherein said second cam portion is mounted by a pivot to said first cam portion, and said cam displacement wheel is rotatably mounted on said second cam portion.

5. The machine set forth in claim 4 wherein said cam displacement wheel is driven by said motor through said pivot.

6. The machine set forth in claim 4 including a latch holding said second cam portion in a first position for moving said second mold segments to said closed position, and being responsive to excess force on said second cam portion from said second mold segments to release said second cam portion to pivot to a second position spaced from said second mold segments.

7. The machine set forth in claim 6 wherein said latch includes a latch arm disposed for engagement by said second cam portion and a spring in engagement with said latch arm.

8. The machine set forth in claim 1 wherein said cam has a first portion for opening said molds, a second portion for closing said molds in sequence, a pivot mounting said second cam portion to said first cam portion, and a latch for holding said second cam portion in a first position for closing said molds in sequence, said latch being responsive to excess force on said second cam portion to release said second cam portion to pivot to a second position spaced from said paths.

9. The machine set forth in claim 8 wherein said latch includes a latch arm disposed for engagement by said second cam portion and a spring in engagement with said latch arm.

10. A machine for compression molding plastic articles, which includes:
   a wheel mounted for rotation around a horizontal axis,
   a plurality of angularly spaced molds disDosed around said wheel, each including a radially outwardly oriented first mold segment and a radially inwardly oriented second mold segment disposed in radially outward alignment with an associated first mold segment at least when said molds are closed, and
   a cam disposed adjacent to said wheel to engage each of said second mold segments in sequence as said wheel rotates to move said second mold segment radially outwardly to an open position with respect to the associated first mold segment for removing a molded article and placing a mold charge into the mold, and a radially inward closed position with the first mold segment to compression mold an article between said mold segments.

11. The machine set forth in claim 10 wherein said cam has a first cam portion of increasing radius with respect to said horizontal axis for moving said second mold segments in sequence from said closed position to said open position, and a second cam portion of decreasing radius with respect to said horizontal axis for moving said second mold segments in sequence from said open position to said closed position.

12. The machine set forth in claim 11 wherein said second cam portion includes at least one cam displacement wheel disposed for engagement by said first mold segments in sequence, said cam displacement wheel being coupled to a motor and having at least one arm disposed to be engaged by and move said second mold segments in sequence onto said second cam portion.

13. The machine set forth in claim 12 wherein said second cam portion is mounted by a pivot to said first cam portion, and said cam displacement wheel is rotatably mounted on said second cam portion.

14. The machine set forth in claim 13 wherein said cam displacement wheel is driven by said motor through said pivot.

15. The machine set forth in claim 13 including a latch holding said second cam portion in a first position for moving said second mold segments to said closed position, and being responsive to excess force on said second cam portion to release said second cam portion to pivot to a second position spaced from said second mold segments.

16. The machine set forth in claim 15 wherein said latch includes a latch arm disposed for engagement by said second cam portion and a spring in engagement with said latch arm.

17. The machine set forth in claim 10 wherein said cam has a first portion for opening said molds in sequence, a second portion for closing said molds in sequence, a pivot mounting said second cam portion to said first cam portion, and a latch for holding said second cam portion in a first position for closing said molds in sequence, said latch being responsive to excess force on said second cam portion to release said second cam portion to pivot to a second position spaced from said paths.

18. The machine set forth in claim 17 wherein said latch includes a latch arm disposed for engagement by said second cam portion and a spring in engagement with said latch arm.

19. A machine for compression molding plastic articles, which includes:
   an array of compression molds mounted on a support for movement through
   a defined mold path, and
   a cam disposed adjacent to said support to engage said molds in sequence and move at least one segment of each said mold between open and closed positions,
   said cam having a first portion for opening said molds, a second portion for closing said molds in sequence, a pivot mounting said second cam portion to said first cam portion, and a latch for holding said second cam portion in a first position for closing said molds in sequence, said latch being responsive to excess force on said second cam portion to release said second cam portion to pivot to a second position spaced from said paths.

20. The machine set forth in claim 19 wherein said latch includes a latch arm disposed for engagement by said second cam portion and a spring in engagement with said latch arm.

21. The machine set forth in claim 20 wherein said second cam portion includes at least one cam displacement wheel disposed for engagement by said molds in sequence, said cam displacement wheel driven in synchronism with said support and having at least one arm disposed to be engaged by and move said molds in sequence onto said second cam portion.

22. The machine set forth in claim 20 wherein said support includes a wheel mounted for rotation around a horizontal axis.

* * * * *

UNITED STATES PATENT AND TRADEMARK OFFICE
CERTIFICATE OF CORRECTION

| | | |
|---|---|---|
| PATENT NO. | : 7,481,646 B2 | |
| APPLICATION NO. | : 11/156114 | |
| DATED | : January 27, 2009 | |
| INVENTOR(S) | : Daniel L. Mattice and B. Jack Rote | |

It is certified that error appears in the above-identified patent and that said Letters Patent is hereby corrected as shown below:

In the drawings, Sheet 5, FIG. 3B:

apply reference numeral 62 and associated lead line to the end or tip of the mold core 58;

apply reference numeral 64 and associated lead line to the first or outer tube extending through the hollow interior of the mold core 58;

apply reference numeral 66 and associated lead line to the second tube or other passage extending through the interior of tube 64; and apply reference numeral 78 and associated lead line to the bearing between the support 46 and the stripper sleeve.

UNITED STATES PATENT AND TRADEMARK OFFICE
CERTIFICATE OF CORRECTION

PATENT NO.         : 7,481,646 B2
APPLICATION NO.    : 11/156114
DATED              : January 27, 2009
INVENTOR(S)        : Daniel L. Mattice and B. Jack Rote Page 2 of 2

It is certified that error appears in the above-identified patent and that said Letters Patent is hereby corrected as shown below:

In the drawings, replace original FIG. 3B on Sheet 5 with the following replacement FIG. 3B.

FIG. 3B

Signed and Sealed this

Seventeenth Day of November, 2009

David J. Kappos
*Director of the United States Patent and Trademark Office*